(12) United States Patent
Kobaru et al.

(10) Patent No.: US 12,504,406 B2
(45) Date of Patent: Dec. 23, 2025

(54) INSPECTION CHIP WITH SIMPLIFIED CHANNEL SWITCHING STRUCTURE

(71) Applicants: SEKISUI CHEMICAL CO., LTD., Osaka (JP); SEKISUI MEDICAL CO., LTD., Tokyo (JP)

(72) Inventors: Shoutarou Kobaru, Osaka (JP); Takamasa Kouno, Osaka (JP); Nobuhiko Inui, Saitama (JP); Kazuhiko Imamura, Osaka (JP); Sou Yamaguchi, Tokyo (JP); Katsura Uchida, Tokyo (JP); Tatsunori Takamatsu, Tokyo (JP)

(73) Assignees: SEKISUI CHEMICAL CO., LTD., Osaka (JP); SEKISUI MEDICAL CO., LTD., Tokyo (JP)

( * ) Notice: Subject to any disclaimer, the term of this patent is extended or adjusted under 35 U.S.C. 154(b) by 372 days.

(21) Appl. No.: 18/026,659

(22) PCT Filed: Sep. 14, 2021

(86) PCT No.: PCT/JP2021/033619
§ 371 (c)(1),
(2) Date: Mar. 16, 2023

(87) PCT Pub. No.: WO2022/065119
PCT Pub. Date: Mar. 31, 2022

(65) Prior Publication Data
US 2023/0333070 A1    Oct. 19, 2023

(30) Foreign Application Priority Data
Sep. 28, 2020   (JP) .................................. 2020-162037

(51) Int. Cl.
*G01N 35/08* (2006.01)
*G01N 30/26* (2006.01)

(52) U.S. Cl.
CPC ............. *G01N 30/26* (2013.01); *G01N 35/08* (2013.01)

(58) Field of Classification Search
CPC ............. G01N 35/1097; G01N 35/085; G01N 2030/201; G01N 2030/202; G01N 35/10;
(Continued)

(56) References Cited

U.S. PATENT DOCUMENTS 6,702,256 B2 *   3/2004   Killeen ............... F16K 99/0001
                                                              251/304
7,128,876 B2 *  10/2006   Yin ......................... B29C 66/54
                                                              210/198.2
(Continued)

FOREIGN PATENT DOCUMENTS

CN    101523222    9/2009
CN    102369443    3/2012
(Continued)

OTHER PUBLICATIONS

Extended Search Report issued Sep. 20, 2024 in European Application No. 21872249.4.
(Continued)

*Primary Examiner* — Tran M. Tran
(74) *Attorney, Agent, or Firm* — Wenderoth, Lind & Ponack, L.L.P.

(57) ABSTRACT

Provided is an inspection chip with simplified channel switching structure, which is generally complicated. An inspection chip 1 including a chip main body 2 having a specimen introduction channel, an adsorption channel including an adsorption unit, a first waste liquid channel, a recovery liquid introduction channel, and a detection channel including a detection unit; and a rotary valve 3 attached to the chip main body 2 so as to be rotatable about a rotation axis, the rotary valve 3 having a plurality of connection
(Continued)

channels, the plurality of connection channels being arranged so that the rotary valve 3 is capable of taking at least a first state and a second state when the rotary valve 3 rotates about the rotation axis, the first state being a state in which the specimen introduction channel, the adsorption channel, and the first waste liquid channel are connected so as to be provided in this order from an upstream side, and the second state being a state in which the recovery liquid introduction channel, the adsorption channel, and the detection channel are connected so as to be provided in this order from the upstream side.

11 Claims, 14 Drawing Sheets

(58) Field of Classification Search
CPC ....... B01L 2300/069; B01L 2300/0681; B01L 2400/0622; B01L 2400/0644; B01L 3/565; B01L 3/502738; B01L 2200/0689; F16K 2099/0084
See application file for complete search history.

(56) References Cited

U.S. PATENT DOCUMENTS

| | | | | |
|---|---|---|---|---|
| 7,384,602 | B2* | 6/2008 | Nagaoka | G01N 35/025 422/561 |
| RE40,511 | E * | 9/2008 | Weiss | F16K 11/074 137/625.11 |
| 8,012,427 | B2* | 9/2011 | Bommarito | B01L 3/502738 422/400 |
| 8,286,663 | B2* | 10/2012 | Kallback | F16K 11/0743 137/625.15 |
| 8,298,763 | B2* | 10/2012 | Regan | G01N 35/08 422/537 |
| 8,813,785 | B2* | 8/2014 | Wan | F16K 11/02 137/240 |
| 9,808,802 | B2* | 11/2017 | Dothie | G01N 33/4915 |
| 10,478,818 | B1* | 11/2019 | Ball | B01L 3/502707 |
| 10,527,192 | B2* | 1/2020 | Cauley, III | F16K 11/0743 |
| 10,634,652 | B2* | 4/2020 | Wachinger | G01N 30/20 |
| 11,426,726 | B2* | 8/2022 | Perkins | B01F 25/314 |
| 11,920,700 | B2* | 3/2024 | Andeshmand | B01L 3/565 |
| 2003/0162304 | A1 | 8/2003 | Dority et al. | |
| 2004/0191856 | A1 | 9/2004 | Hirabayashi et al. | |
| 2009/0188868 | A1 | 7/2009 | Yin et al. | |
| 2010/0190146 | A1 | 7/2010 | Bynum et al. | |
| 2010/0317538 | A1 | 12/2010 | Seki et al. | |
| 2011/0014096 | A1* | 1/2011 | Fukuoka | F04B 19/006 422/503 |
| 2011/0044863 | A1* | 2/2011 | Fukuoka | B01L 3/50273 422/502 |
| 2012/0015828 | A1 | 1/2012 | Ozawa et al. | |
| 2014/0134075 | A1* | 5/2014 | Fukuoka | F04B 19/006 422/505 |
| 2015/0190810 | A1 | 7/2015 | Glezer et al. | |
| 2015/0198611 | A1 | 7/2015 | Ostrowski et al. | |
| 2017/0028403 | A1 | 2/2017 | Krause | |
| 2017/0144155 | A1 | 5/2017 | Bohm et al. | |
| 2019/0249799 | A1 | 8/2019 | Cauley, III et al. | |
| 2020/0206737 | A1 | 7/2020 | Bohm et al. | |
| 2022/0128524 | A1 | 4/2022 | Murata et al. | |
| 2022/0323963 | A1* | 10/2022 | Ohiri | B01L 3/502715 |
| 2024/0207848 | A1* | 6/2024 | Kobaru | B32B 27/08 |
| 2024/0326044 | A1* | 10/2024 | Kouno | G01N 35/00 |

FOREIGN PATENT DOCUMENTS

| | | |
|---|---|---|
| CN | 110988228 | 4/2020 |
| JP | 2004-283083 | 10/2004 |
| JP | 2005-214741 | 8/2005 |
| JP | 2008-175798 | 7/2008 |
| JP | 2017-522546 | 8/2017 |
| WO | 2018/221576 | 12/2018 |
| WO | 2020/170472 | 8/2020 |

OTHER PUBLICATIONS

International Preliminary Report on Patentability issued Mar. 28, 2023 in International (PCT) Application No. PCT/JP2021/033619.
International Search Report (ISR) issued Nov. 16, 2021 in International (PCT) Application No. PCT/JP2021/033619.

* cited by examiner

[FIG. 1.]
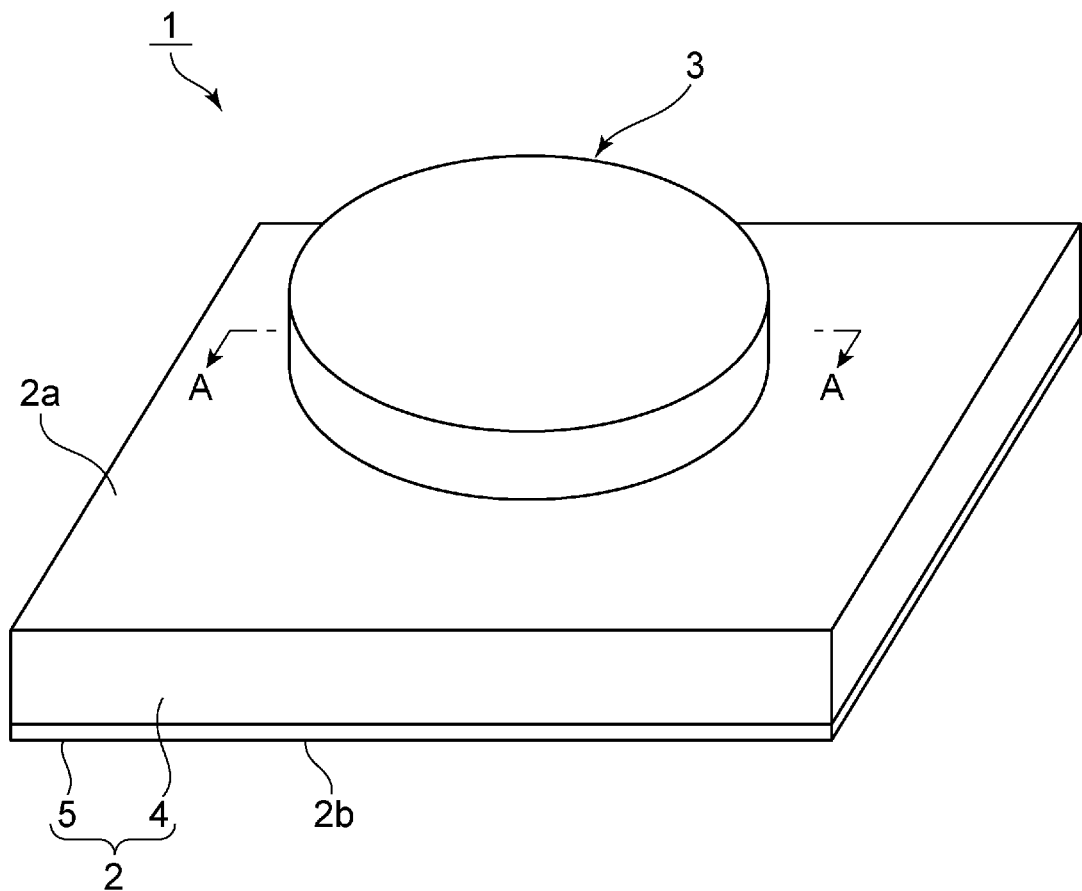
[FIG. 2.]
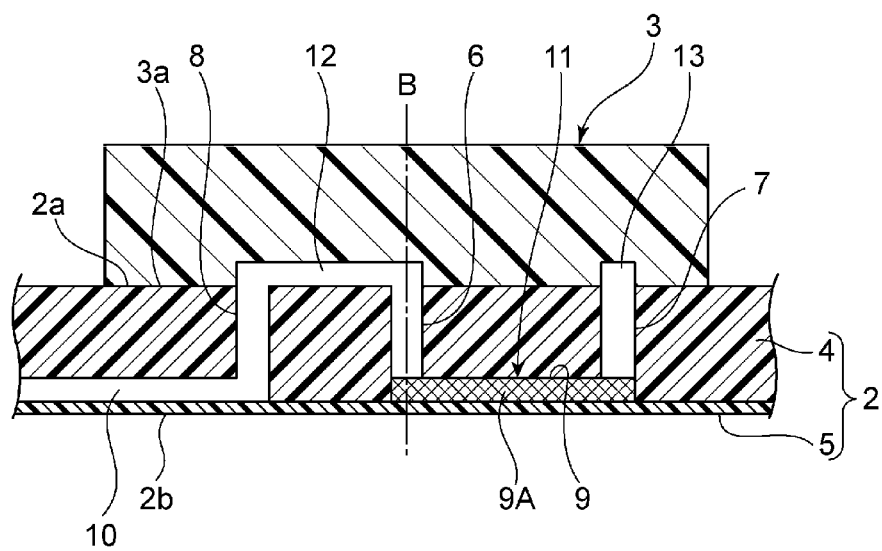

[FIG. 3.]
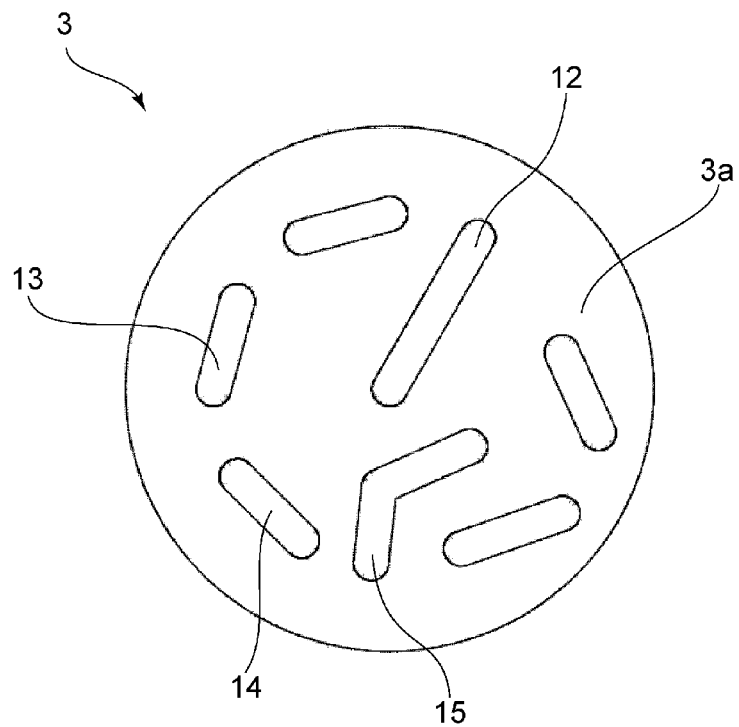
[FIG. 4.]
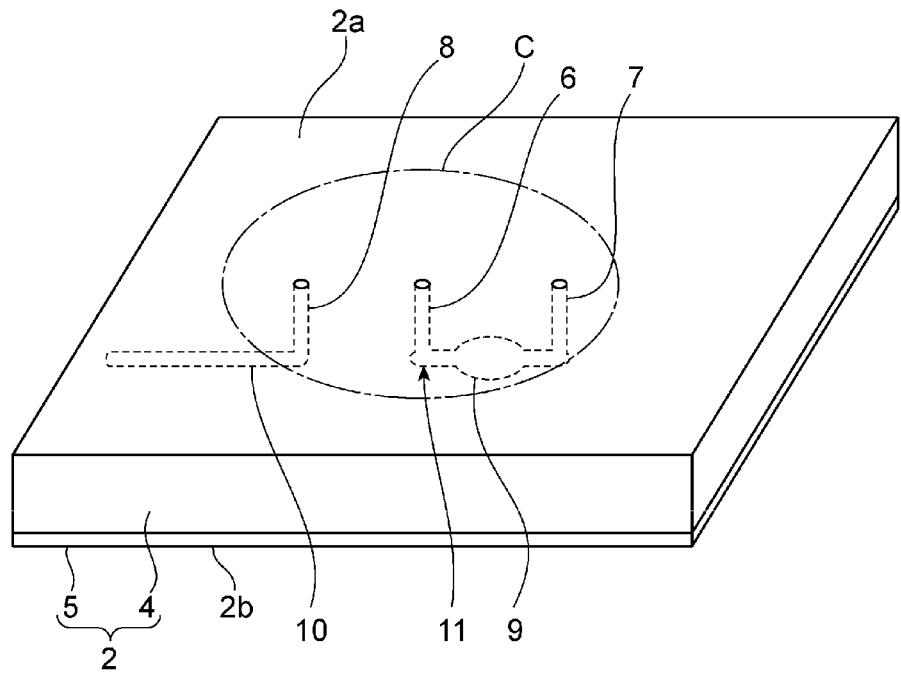

[FIG. 5.]
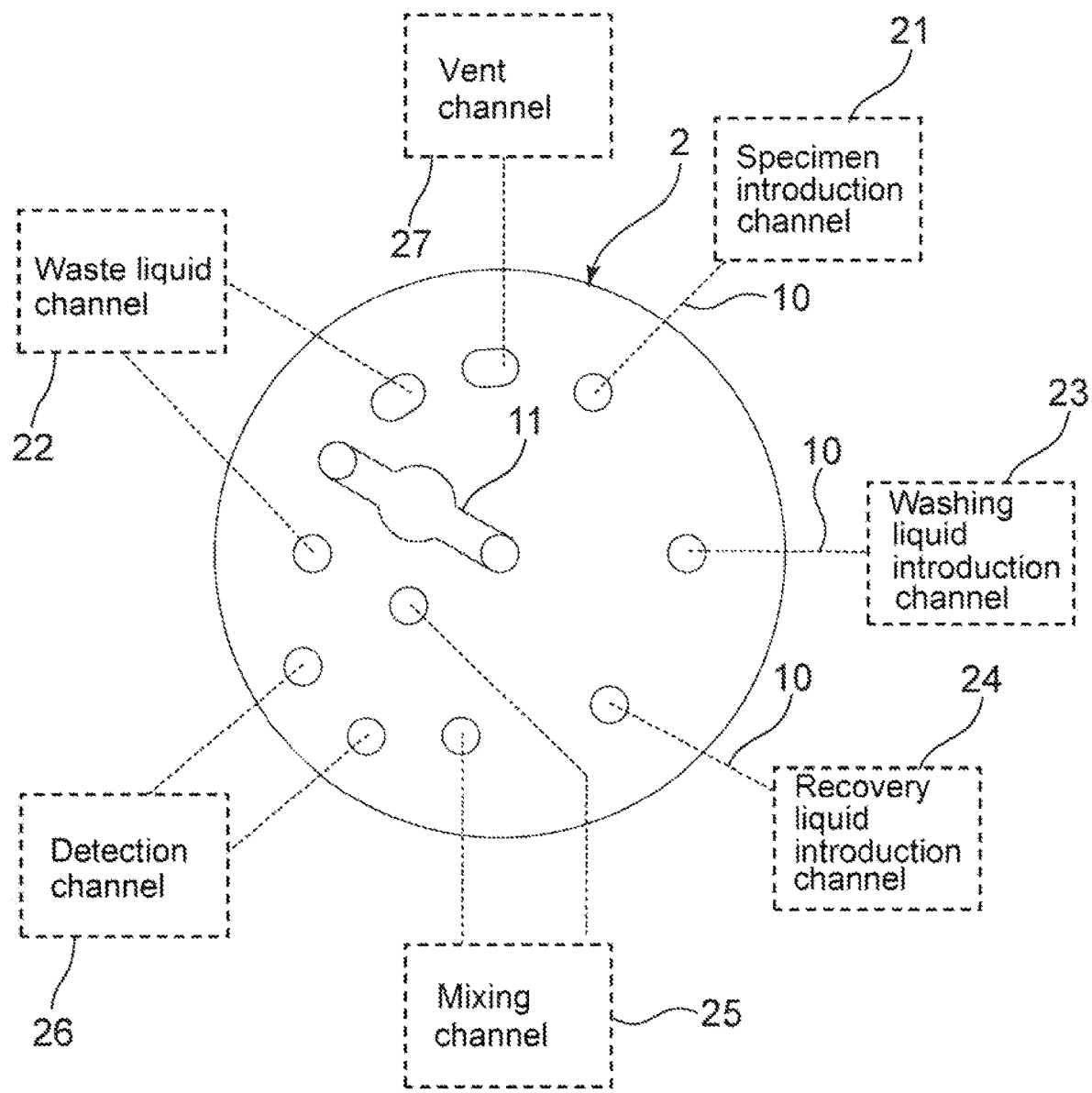

[FIG. 6.]
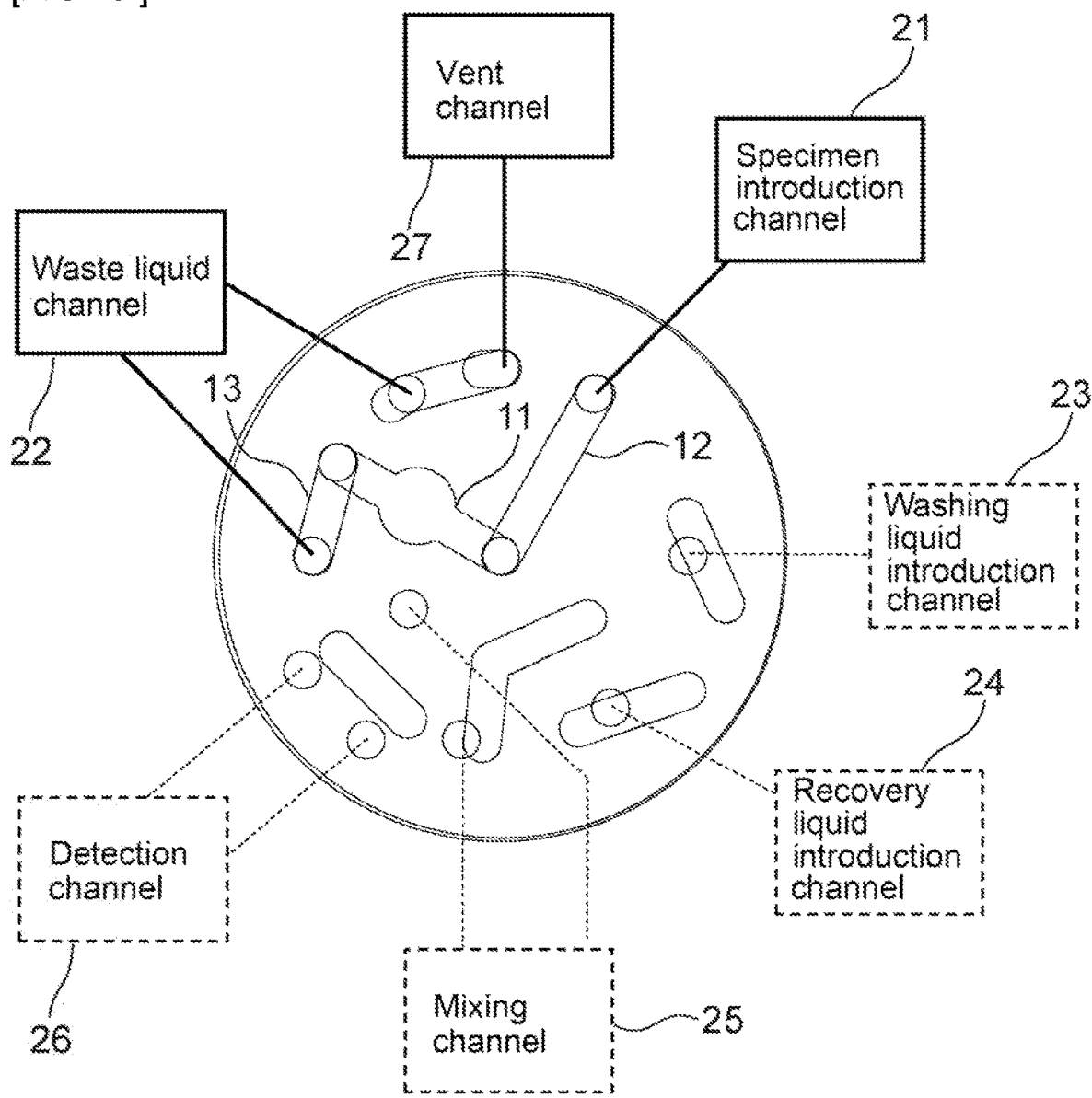

[FIG. 7.]
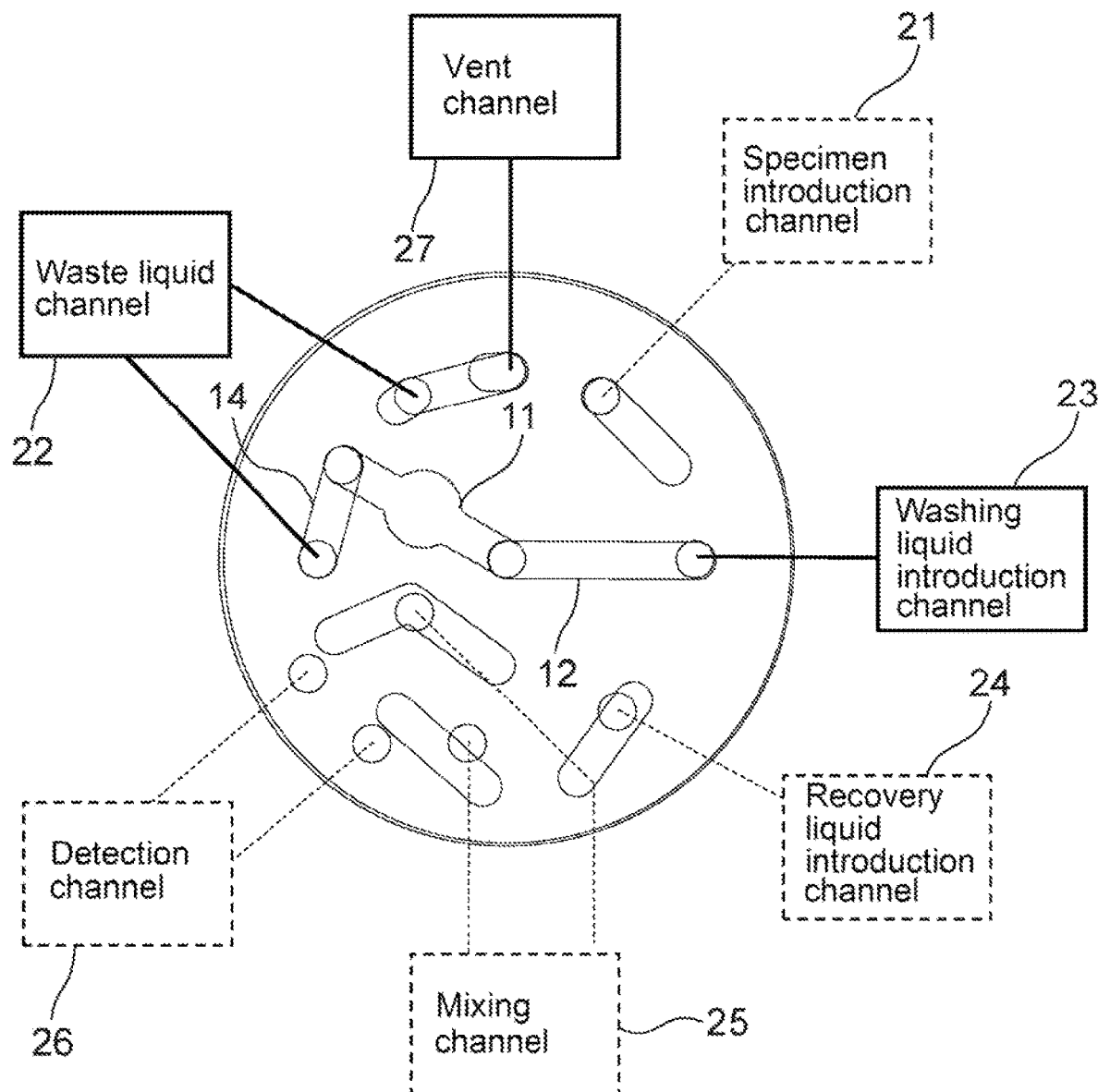

[FIG. 8.]
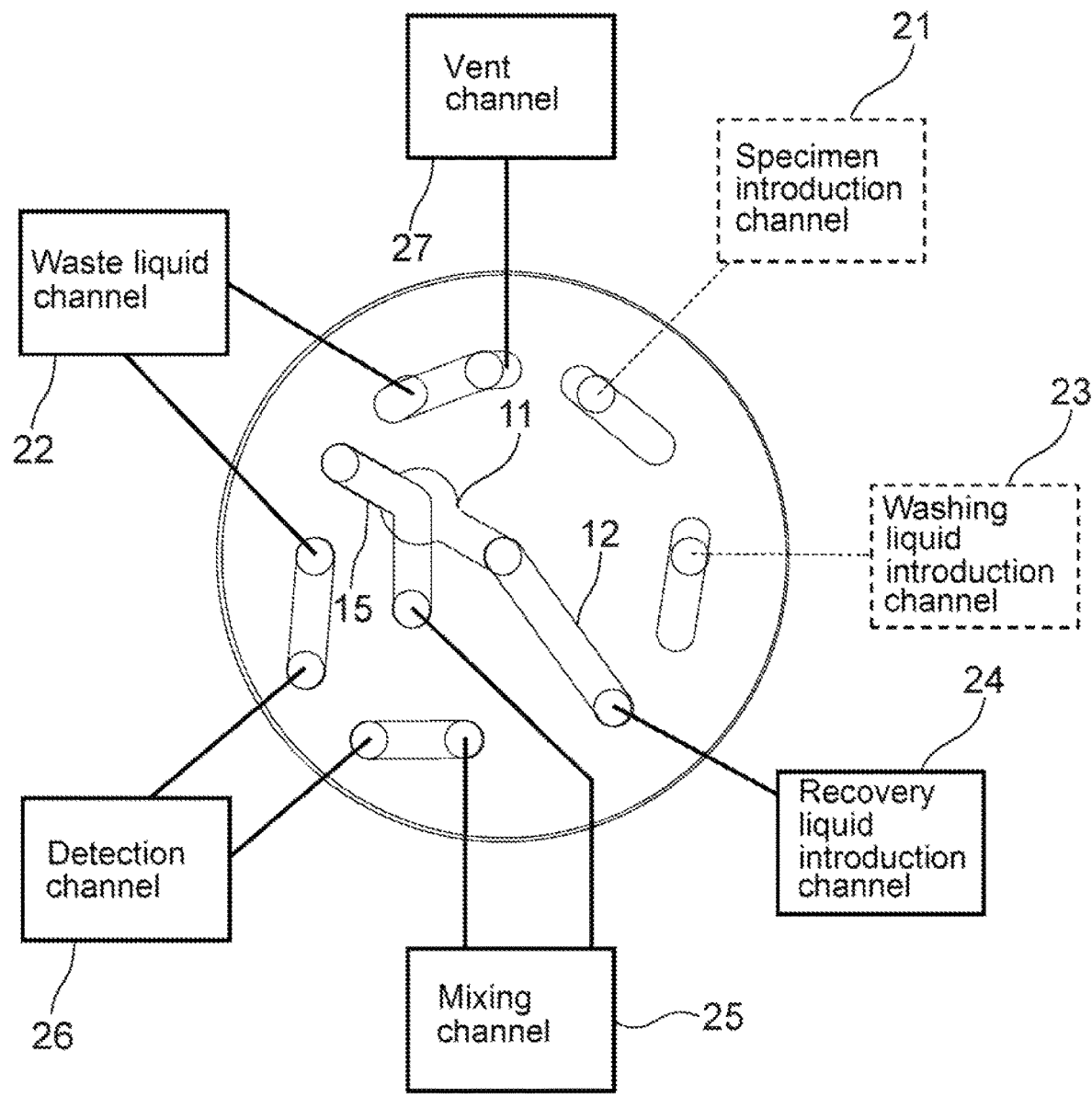

[FIG. 9.]
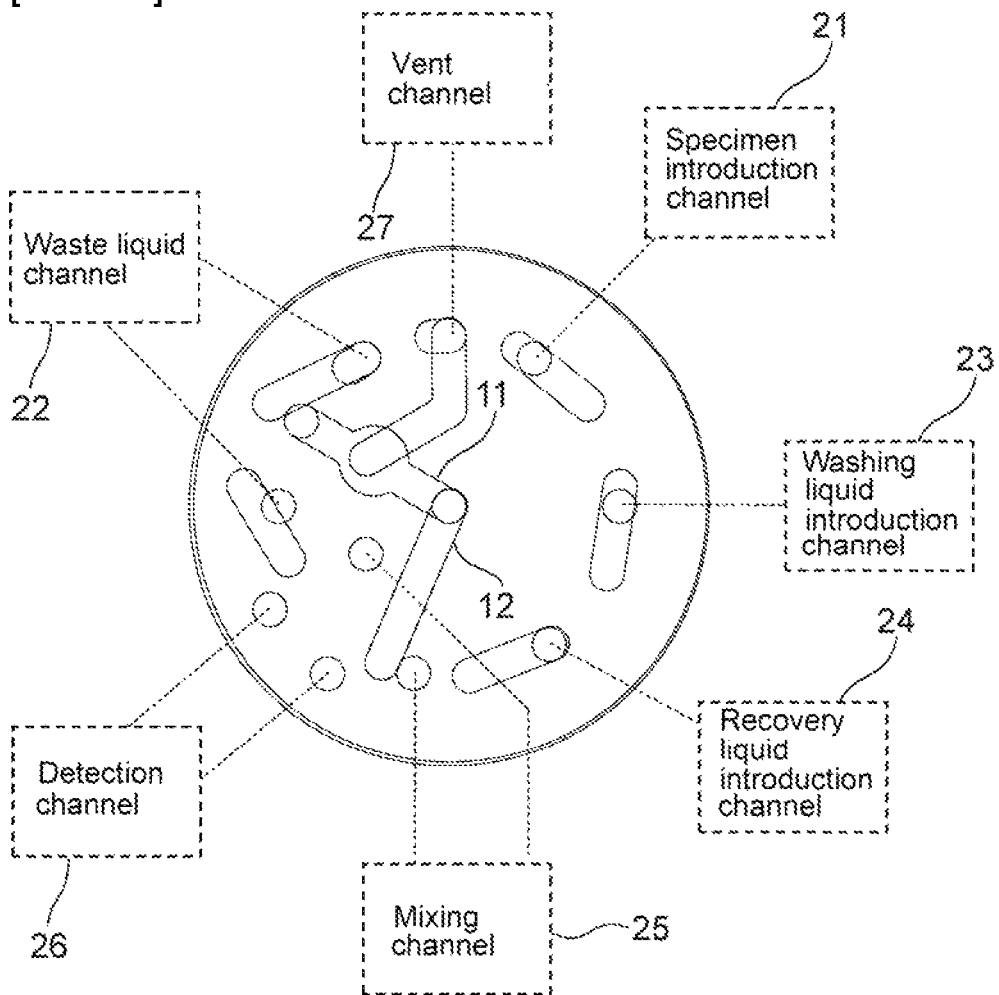
[FIG. 10.]
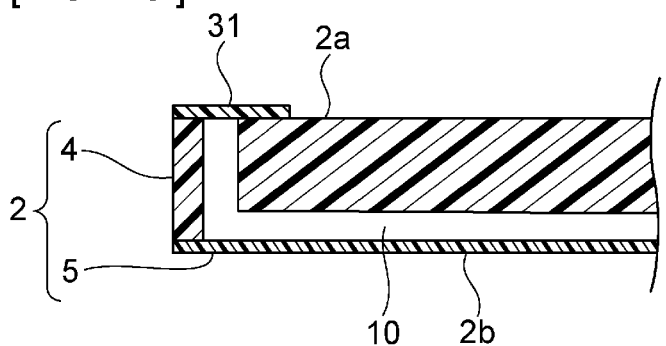
[FIG. 11.]
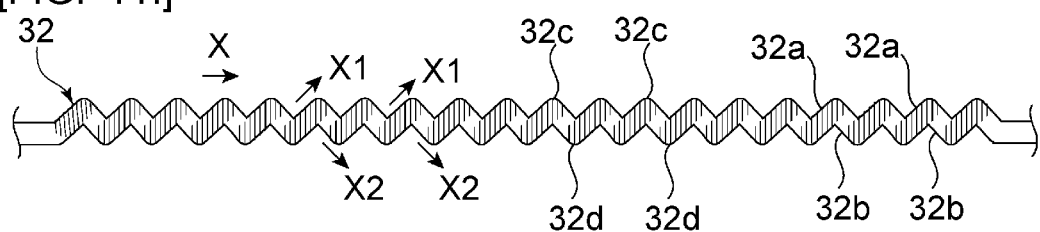

[FIG. 12.]
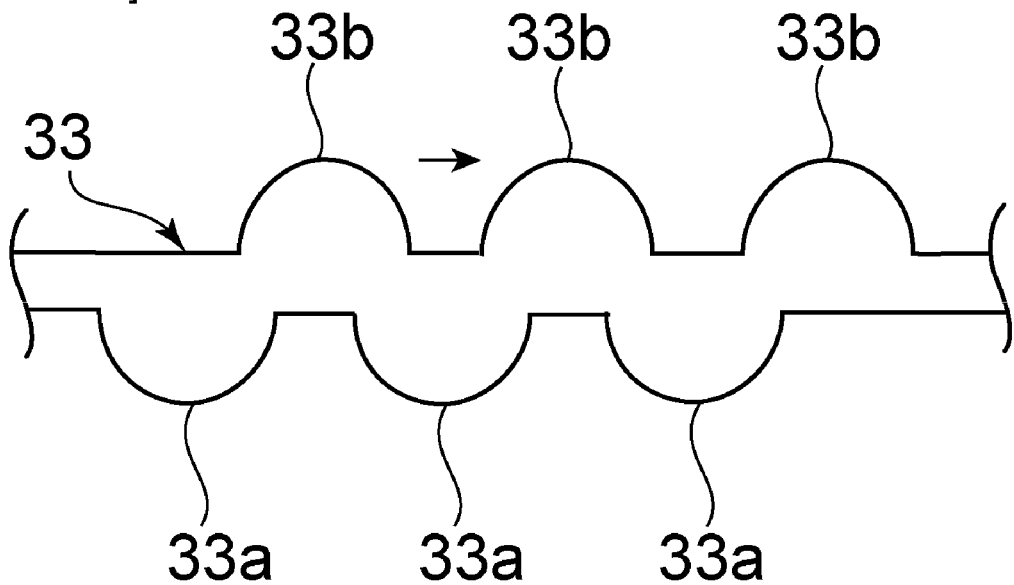
[FIG. 13.]
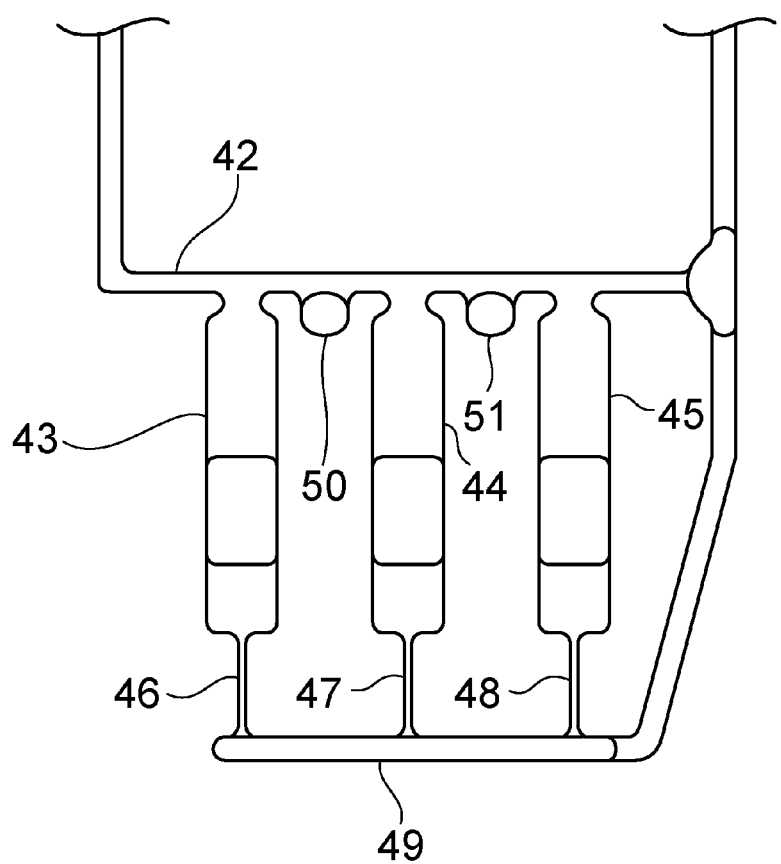

[FIG. 14.]
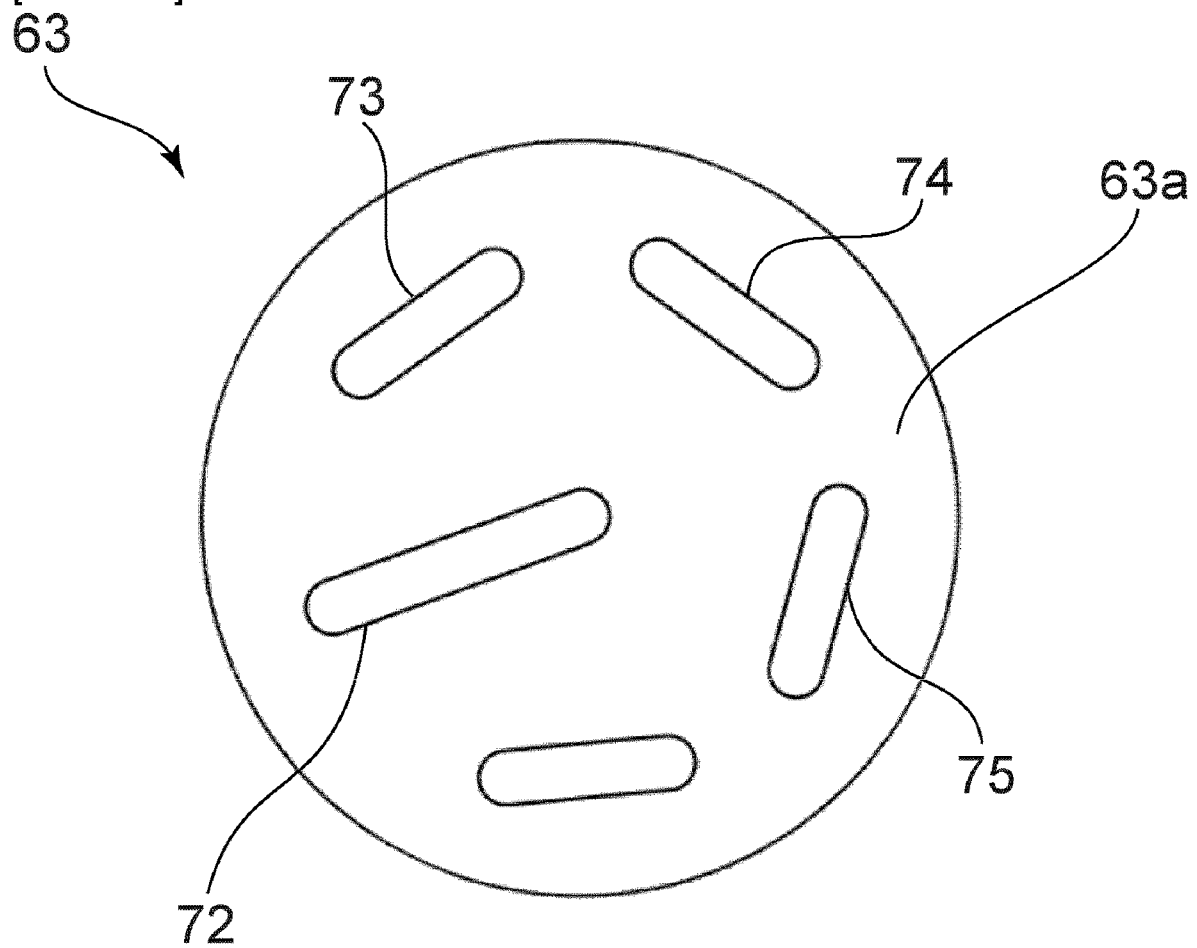

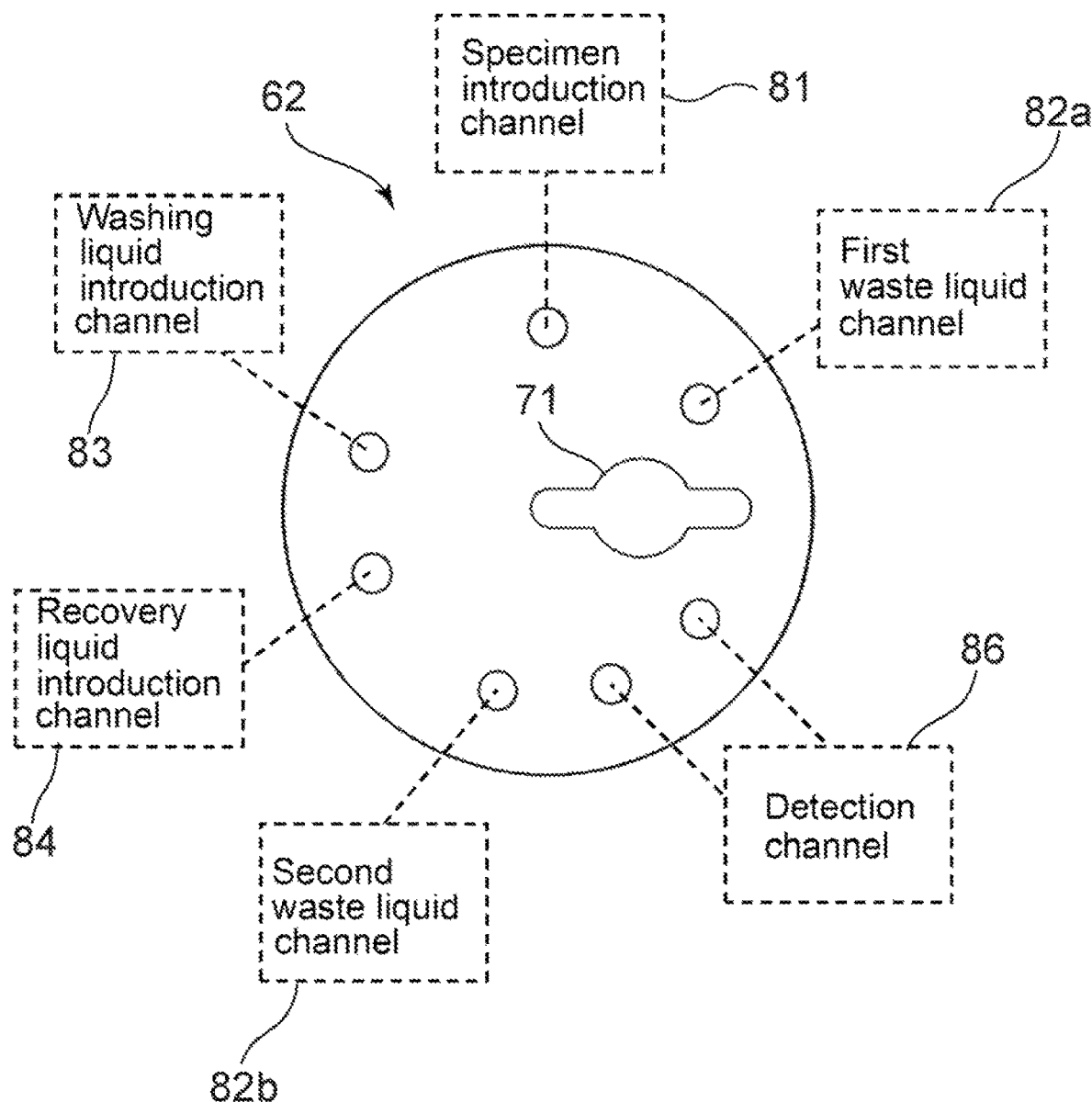
[FIG. 15.]

[FIG. 16.]
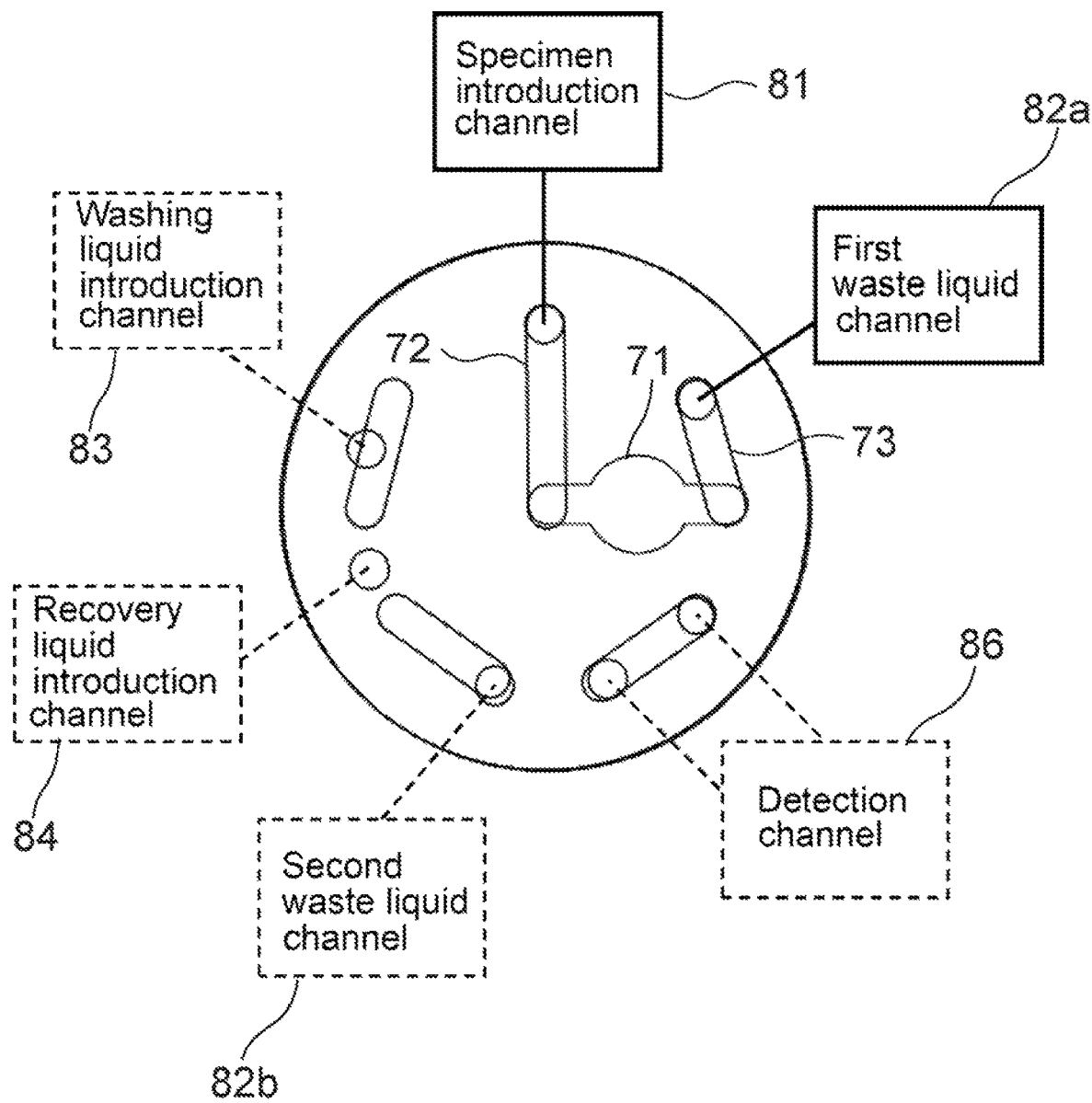

[FIG. 17.]
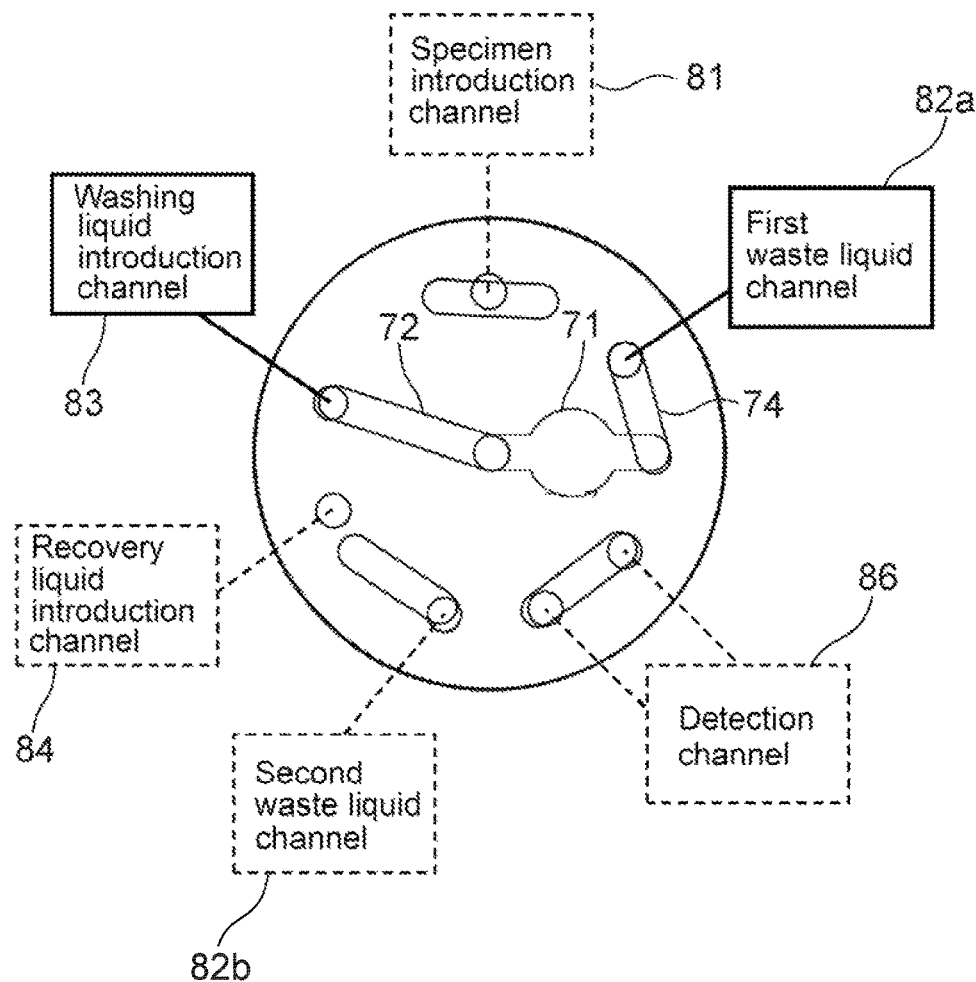

[FIG. 18.]
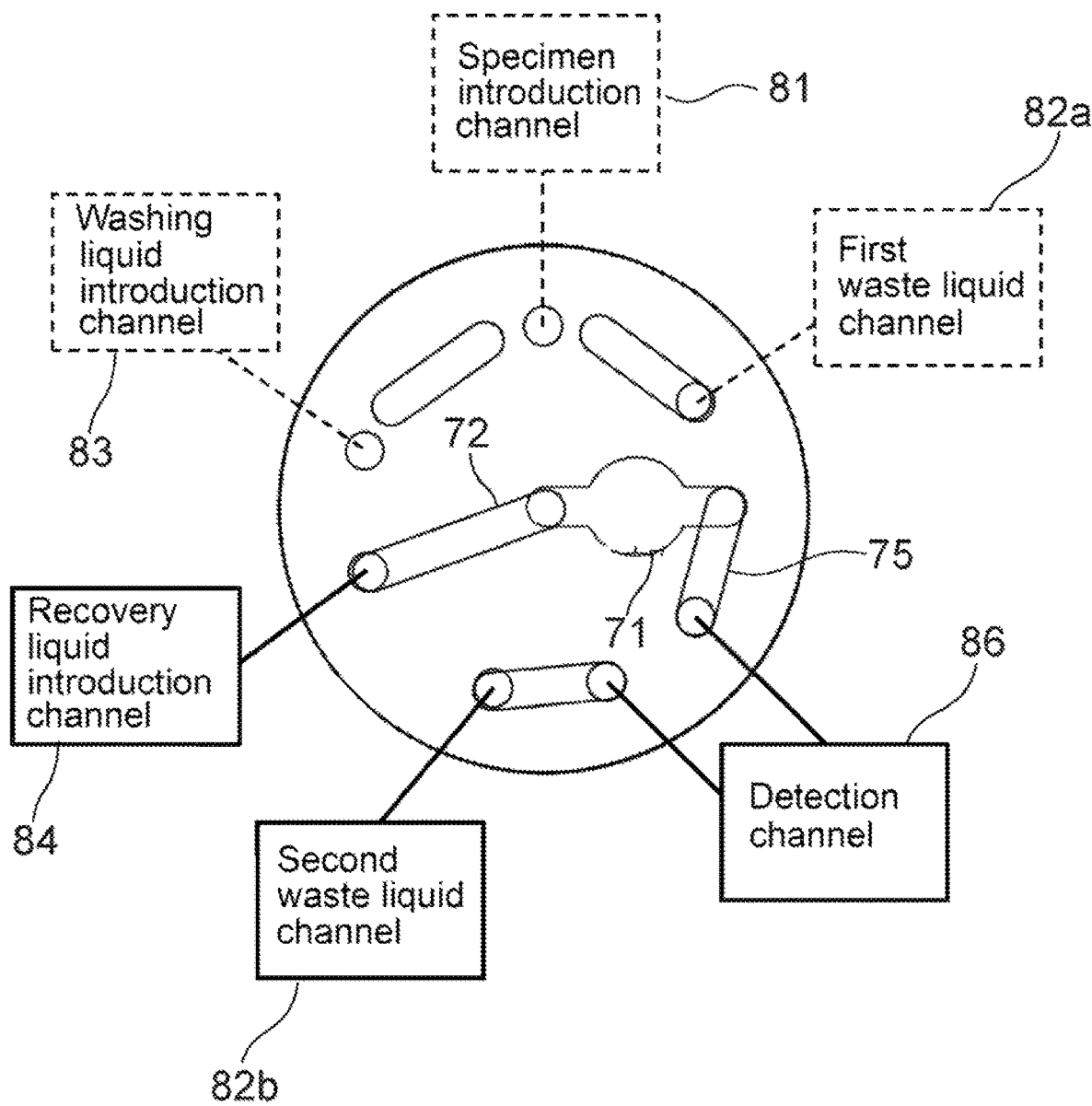

[FIG. 19.]
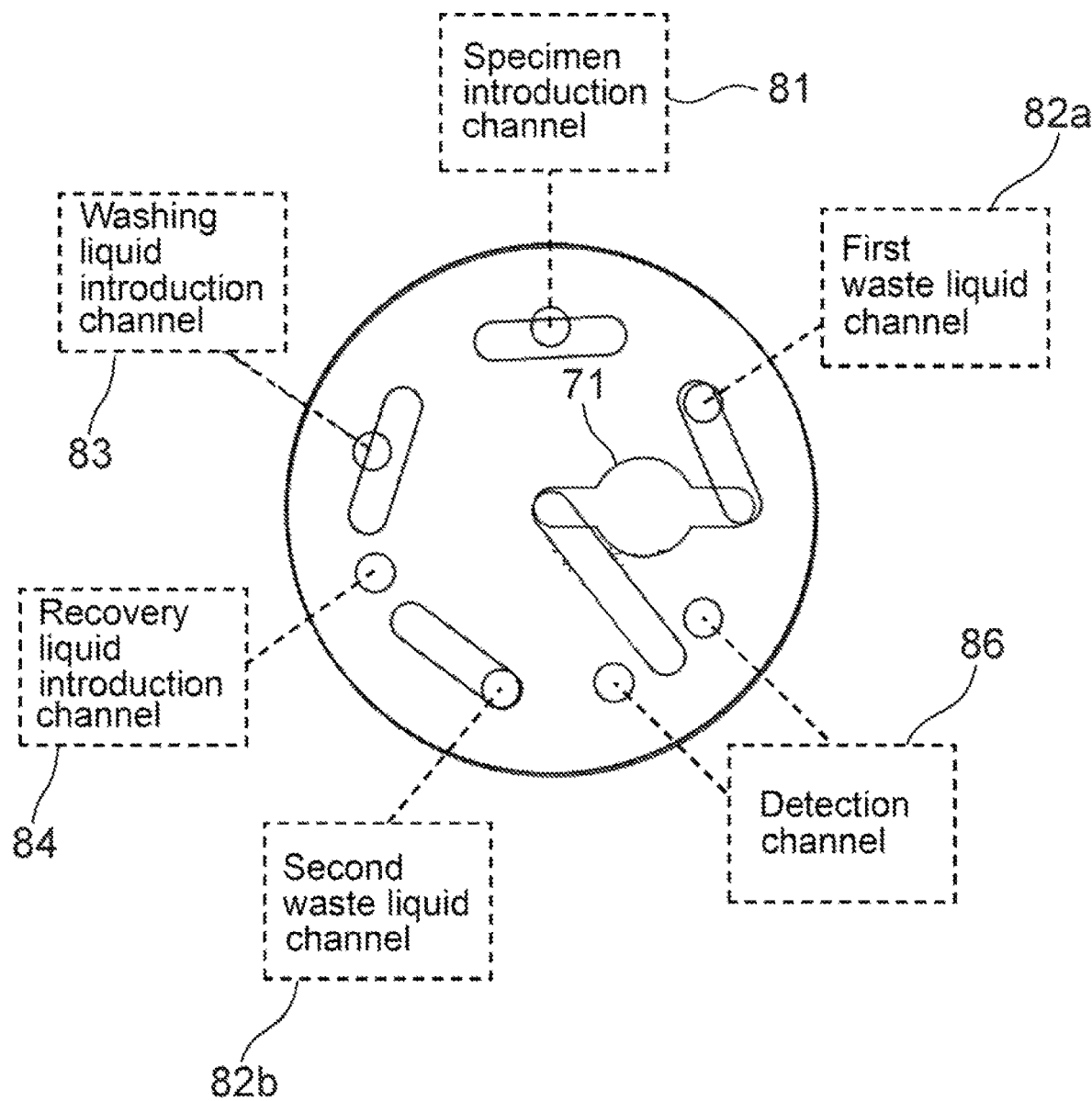

INSPECTION CHIP WITH SIMPLIFIED CHANNEL SWITCHING STRUCTURE

TECHNICAL FIELD

The present invention relates to an inspection chip provided with a channel switching structure.

BACKGROUND ART

Conventionally, tests such as blood tests and genetic tests have been attempted by controlling liquid feeding and reactions of various specimens or samples by using an inspection chip provided with a channel through which a fluid is delivered.

For example, Patent Document 1 below discloses an inspection chip in which a fine channel is provided in a plate-shaped base material. The plate-shaped base material is provided with a through hole connected to the fine channel. External channel means movable on an outer surface of the plate-shaped base material is provided. The external channel means has a channel. By moving the external channel means on the surface of the base material, a connection state between the channel of the external channel means and the through hole is changed. The channel is thus switched.

RELATED ART DOCUMENT

Patent Document

Patent Document 1: JP 2005-214741 A

SUMMARY OF THE INVENTION

Problems to be Solved by the Invention

In an inspection chip like the one disclosed in Patent Document 1, when analysis is performed by using a plurality of reagents or samples, switching of a channel becomes more complicated.

An object of the present invention is to provide an inspection chip with simplified channel switching structure, which is generally complicated.

MEANS FOR SOLVING THE PROBLEMS

An inspection chip according to the present invention includes a chip main body having a specimen introduction channel, an adsorption channel including an adsorption unit, a first waste liquid channel, a recovery liquid introduction channel, and a detection channel including a detection unit; and a rotary valve attached to the chip main body so as to be rotatable about a rotation axis, the rotary valve having a plurality of connection channels, the plurality of connection channels being arranged so that the rotary valve is capable of taking at least a first state and a second state when the rotary valve rotates about the rotation axis, the first state being a state in which the specimen introduction channel, the adsorption channel, and the first waste liquid channel are connected so as to be provided in this order from an upstream side, and the second state being a state in which the recovery liquid introduction channel, the adsorption channel, and the detection channel are connected so as to be provided in this order from the upstream side.

In a specific aspect of the inspection chip according to the present invention, in the second state, one of the plurality of connection channels connects a downstream end of the adsorption channel and an upstream end of the detection channel.

In another specific aspect of the inspection chip according to the present invention, the chip main body further has a mixing channel; and in the second state, the recovery liquid introduction channel, the adsorption channel, the mixing channel, and the detection channel are connected so as to be provided in this order from the upstream side.

In still another specific aspect of the inspection chip according to the present invention, the chip main body further has a second waste liquid channel; and in the second state, the recovery liquid introduction channel, the adsorption channel, the detection channel, and the second waste liquid channel are connected so as to be provided in this order from the upstream side.

In still another specific aspect of the inspection chip according to the present invention, the chip main body further has a vent channel; and in the second state, the recovery liquid introduction channel, the adsorption channel, the detection channel, the second waste liquid channel, and the vent channel are connected so as to be provided in this order from the upstream side.

In still another specific aspect of the inspection chip according to the present invention, the chip main body further has a washing liquid introduction channel; and the plurality of connection channels is arranged so that the rotary valve is capable of taking at least the first state, the second state, and a third state when the rotary valve rotates about the rotation axis, the third state being a state in which the washing liquid introduction channel, the adsorption channel, and the first waste liquid channel are connected so as to be provided in this order from the upstream side.

In still another specific aspect of the inspection chip according to the present invention, the plurality of connection channels is arranged so that the rotary valve is capable of taking the first state, the third state, and the second state in this order when the rotary valve rotates about the rotation axis.

In still another specific aspect of the inspection chip according to the present invention, the plurality of connection channels is arranged so that the rotary valve is capable of further taking a fourth state after the second state when the rotary valve rotates about the rotation axis, the fourth state being a state in which an upstream end and a downstream end of the detection channel are sealed.

In still another specific aspect of the inspection chip according to the present invention, the plurality of connection channels is arranged so that the rotary valve is capable of further taking a fifth state after the second state when the rotary valve rotates about the rotation axis, the fifth state being a state in which an upstream end and a downstream end of the detection channel are sealed and an upstream end and a downstream end of the second waste liquid channel are sealed.

In still another specific aspect of the inspection chip according to the present invention, the adsorption channel is provided at a position where the adsorption channel overlaps the rotary valve in plan view.

In still another specific aspect of the inspection chip according to the present invention, a hydrophobic filter is connected to a downstream end of at least one of the first waste liquid channel and the second waste liquid channel.

In still another specific aspect of the inspection chip according to the present invention, the inspection chip further includes an optical gas generation tape that generates gas upon irradiation of light, and liquid feeding is performed by the gas generated from the optical gas generation tape.

Effect of the Invention

According to the present invention, it is possible to provide an inspection chip with simplified channel switching structure, which is generally complicated.

BRIEF DESCRIPTION OF DRAWINGS

FIG. 1 is a schematic perspective view illustrating an appearance of an inspection chip according to a first embodiment of the present invention.

FIG. 2 is a schematic cross-sectional view of a portion taken along line A-A in FIG. 1.

FIG. 3 is a schematic plan view for explaining channels in a rotary valve in the inspection chip according to the first embodiment of the present invention.

FIG. 4 is a schematic perspective view for explaining channels provided in the chip main body in the inspection chip according to the first embodiment of the present invention.

FIG. 5 is a schematic plan view for explaining details of the channels provided in the chip main body in the inspection chip according to the first embodiment of the present invention.

FIG. 6 is a schematic plan view for explaining a channel connection state in a first state of the inspection chip according to the first embodiment of the present invention.

FIG. 7 is a schematic plan view for explaining a channel connection state in a third state of the inspection chip according to the first embodiment of the present invention.

FIG. 8 is a schematic plan view for explaining a channel connection state in a second state of the inspection chip according to the first embodiment of the present invention.

FIG. 9 is a schematic plan view for explaining a channel connection state in a fourth state of the inspection chip according to the first embodiment of the present invention.

FIG. 10 is a schematic cross-sectional view for explaining a liquid feeding method using an optical gas generation tape.

FIG. 11 is a schematic plan view for explaining a first mixing channel used in the inspection chip according to the first embodiment of the present invention.

FIG. 12 is a schematic plan view for explaining a second mixing channel used in the inspection chip according to the first embodiment of the present invention.

FIG. 13 is a schematic plan view for explaining a detection channel used in the inspection chip according to the first embodiment of the present invention.

FIG. 14 is a schematic plan view for explaining channels in a rotary valve in an inspection chip according to a second embodiment of the present invention.

FIG. 15 is a schematic plan view for explaining channels in a chip main body in the inspection chip according to the second embodiment of the present invention.

FIG. 16 is a schematic plan view for explaining a channel connection state in a first state of the inspection chip according to the second embodiment of the present invention.

FIG. 17 is a schematic plan view for explaining a channel connection state in a third state of the inspection chip according to the second embodiment of the present invention.

FIG. 18 is a schematic plan view for explaining a channel connection state in a second state of the inspection chip according to the second embodiment of the present invention.

FIG. 19 is a schematic plan view for explaining a channel connection state in a fourth state of the inspection chip according to the second embodiment of the present invention.

MODES FOR CARRYING OUT THE INVENTION

Hereinafter, the present invention will be clarified by describing specific embodiments of the present invention with reference to the drawings.

First Embodiment (Configuration of Inspection Chip)

FIG. 1 is a schematic perspective view illustrating an appearance of an inspection chip according to a first embodiment of the present invention. FIG. 2 is a schematic cross-sectional view of a portion taken along line A-A in FIG. 1.

The inspection chip 1 includes a chip main body 2 and a rotary valve 3. The chip main body 2 may have any shape, but has a rectangular plate shape. The chip main body 2 has a first surface 2a and a second surface 2b opposite to the first surface 2a. On the first surface 2a side, the rotary valve 3 is attached to the chip main body 2 so as to be rotatable about a central axis which is a rotation axis.

The chip main body 2 includes a substrate 4 and a sealing sheet 5 laminated on the substrate 4. The substrate 4 is made of an appropriate material such as a synthetic resin. A surface of the substrate 4 opposite to the sealing sheet 5 is the first surface 2a of the chip main body 2. An outer surface of the sealing sheet 5 is the second surface 2b of the chip main body 2. The sealing sheet 5 is made of an appropriate sheet such as a synthetic resin sheet.

In the substrate 4, a first channel 6, a second channel 7, and a third channel 8 are provided. The first channel 6, the second channel 7, and the third channel 8 are opened in the first surface 2a. The first channel 6, the second channel 7, and the third channel 8 extend so as to connect the first surface 2a and the second surface 2b.

A groove provided on the lower surface of the substrate 4 is sealed, and thus an adsorption unit 9 is provided. An adsorbent 9A is accommodated in the adsorption unit 9.

An end portion of the first channel 6 on a side opposite to an end portion thereof opened in the first surface 2a is connected to the adsorption unit 9. An end portion of the second channel 7 on a side opposite to an end portion thereof opened in the first surface 2a is connected to the adsorption unit 9. As a result, the adsorption unit 9 is connected between the first channel 6 and the second channel 7. In the present embodiment, the adsorption unit 9, the first channel 6, and the second channel 7 constitute an adsorption channel 11.

The rotary valve 3 is attached to the substrate 4 so as to be rotatable about a rotation axis B which is a central axis. The first channel 6 is provided so as to include the rotation axis B. Preferably, the central axis of the first channel 6 coincides with the rotation axis B.

A groove provided on the lower surface of the substrate 4 is sealed, and thus a fourth channel 10 is provided. The fourth channel 10 is connected to an end portion of the third channel 8 on a side opposite to an end portion thereof opened in the first surface 2a of the chip main body 2. The fourth channel 10 extends away from the rotation axis B in a radial direction of the rotary valve 3. In the present embodiment, the third channel 8 and the fourth channel 10 constitute a specimen introduction channel, a recovery liquid introduction channel, or a washing liquid introduction channel. Although the fourth channel 10 is provided on a same straight line as the adsorption unit 9 in FIG. 2 for convenience of description, the fourth channel 10 constituting the specimen introduction channel, the recovery liquid introduction channel, or the washing liquid introduction channel is not provided on the same straight line as the adsorption unit 9 in the present embodiment. Note, however, that the fourth channel 10 may be provided on the same straight line as the adsorption unit 9.

FIG. 3 is a schematic plan view for explaining channels in a rotary valve in the inspection chip according to the first embodiment of the present invention. On a lower surface 3a of the rotary valve 3, a first connection channel 12 and a plurality of second connection channels 13 to 15 are provided. The first connection channel 12 and the second connection channels 13 to 15 are provided by providing a groove having a shape like the one illustrated in FIG. 3 on the lower surface 3a of the rotary valve 3. As illustrated in FIG. 2, the groove is sealed by the first surface 2a of the chip main body 2, and thus the first connection channel 12 and the second connection channel 13 are formed. Although the second connection channel 13 is illustrated in FIG. 2, the other second connection channels 14 and 15 are similarly configured.

As illustrated in FIG. 2, one end of the first connection channel 12 reaches a portion where the rotation axis B exists, and is connected to the first channel 6. The first connection channel 12 extends outward in the radial direction of the rotary valve 3 from the rotation axis B of the rotary valve 3. Although the first connection channel 12 is linear in this case, the first connection channel 12 may have another planar shape such as a curved shape, a meander shape, or an L shape. Therefore, the first connection channel 12 is not limited to extending from the rotation axis B to the outside in the radial direction of the rotary valve 3, and needs to just extend from the rotation axis B to the outside. A radially outer end portion of the first connection channel 12 is connected to the third channel 8 in FIG. 2. However, by rotating the rotary valve 3 about the rotation axis B, the radially outer end portion of the first connection channel 12 can also be connected to other channels.

The second connection channel 13 is provided at a position separated from the first connection channel 12 and separated from the rotation axis B. In the state illustrated in FIG. 2, the second connection channel 13 is connected to the second channel 7. By rotating the rotary valve 3 about the rotation axis B, the second channel 7 can be connected to other second connection channels 14 and 15 in the rotary valve 3. Alternatively, instead of the second connection channel 13, other second connection channels 14 and 15 can be connected to a channel such as the second channel 7 in the chip main body 2.

FIG. 4 is a schematic perspective view for explaining channels provided in the chip main body in the inspection chip according to the first embodiment of the present invention. On the first surface 2a side of the chip main body 2, the rotary valve 3 is attached at a position indicated by an alternate long and short dash line C. In a region where the rotary valve 3 is attached, one end of the first channel 6, one end of the second channel 7, and one end of the third channel 8 are opened in the first surface 2a. As indicated by the broken line, the first channel 6, the second channel 7, and the third channel 8 extend from the first surface 2a toward the second surface 2b of the chip main body 2. The adsorption unit 9 is connected between the first channel 6 and the second channel 7. The end portion of the third channel 8 on the side opposite to the side opened in the first surface 2a is connected to the fourth channel 10.

Although not illustrated in FIGS. 1, 2, and 4, a specimen introduction channel 21, a waste liquid channel 22, a washing liquid introduction channel 23, a recovery liquid introduction channel 24, a mixing channel 25, a detection channel 26, and a vent channel 27 illustrated in FIG. 5 are provided in the chip main body 2. Note that a plurality of the fourth channels 10 described above is provided in the chip main body 2, and the fourth channels 10 constitute the specimen introduction channel 21, the washing liquid introduction channel 23, and the recovery liquid introduction channel 24. Alternatively, the fourth channels 10 may be connected to the specimen introduction channel 21, the washing liquid introduction channel 23, and the recovery liquid introduction channel 24.

By rotating the rotary valve 3 about the rotation axis B, the first connection channel 12 can be connected to the specimen introduction channel 21, the washing liquid introduction channel 23, and the recovery liquid introduction channel 24. Furthermore, the second connection channels 13 to 15 can be connected to the waste liquid channel 22 and the mixing channel 25.

In the inspection chip 1, a plurality of connection channels is arranged so that at least a first state and a second state described below can be taken when the rotary valve 3 is rotated about the rotation axis B.

The first state is a state in which the specimen introduction channel 21, the adsorption channel 11, and the waste liquid channel 22 are connected in this order from an upstream side. In the present embodiment, the specimen introduction channel 21 and the adsorption channel 11 are connected by the first connection channel 12. Furthermore, the adsorption channel 11 and the waste liquid channel 22 are connected by the second connection channel 13.

The second state is a state in which the recovery liquid introduction channel 24, the adsorption channel 11, and the detection channel 26 are connected in this order from the upstream side. In the present embodiment, the recovery liquid introduction channel 24 and the adsorption channel 11 are connected by the first connection channel 12. Furthermore, the mixing channel 25 is provided between the adsorption channel 11 and the detection channel 26, and the adsorption channel 11 and the mixing channel 25 are connected by the second connection channel 15. Furthermore, in the present embodiment, the waste liquid channel 22 is connected to a downstream side of the detection channel 26. Furthermore, the vent channel 27 is connected to a downstream side of the waste liquid channel 22. Note, however, that the mixing channel 25 and the vent channel 27 need not necessarily be provided. The waste liquid channel 22 need not necessarily be connected to the downstream side of the detection channel 26.

By rotating the rotary valve 3 and performing the first state and the second state in this order, for example, a nucleic acid extracted from a specimen by using an extraction liquid can be adsorbed to the adsorbent 9A, recovered, and subjected to a test such as PCR (Polymerase Chain Reaction) in the inspection chip 1. Furthermore, the inspection chip 1 of the present embodiment can be also applied to various reaction tests and inspections requiring same or similar liquid feeding step by using suitable adsorbent and detection method.

In the present embodiment, the rotary valve 3 is configured to be rotated about the rotation axis B so as to be able to take at least the first state and the second state. In this case, the rotary valve 3 may be configured to take a third state, a fourth state, and the like in addition to the first state and the second state. For example, the rotary valve 3 may be configured to perform a third state of flowing a washing liquid between the first state of flowing a specimen and the second state of flowing a recovery liquid. Furthermore, the rotary valve 3 may be configured to perform a fourth state in which at least an upstream end and a downstream end of the detection channel 26 are sealed.

In the present embodiment, the one first connection channel 12 and the three second connection channels 13 to 15 constitute a plurality of connection channels. Note, however, that in the present invention, a plurality of first connection channels may be provided. The number of first connection channels can be, for example, 1 or more and 3 or less. The number of second connection channels can be, for example, 1 or more and 10 or less. The total number of connection channels can be, for example, 2 or more and 13 or less.

(Method of Using Inspection Chip)

An example of a method of using the inspection chip 1 is described with reference to FIGS. 6 to 9.

FIG. 6 is a schematic plan view for explaining a channel connection state in the first state of the inspection chip according to the first embodiment of the present invention. The rotary valve 3 is rotated to connect the specimen introduction channel 21, the adsorption channel 11, and the waste liquid channel 22 in this order as illustrated in FIG. 6. In the present embodiment, the specimen introduction channel 21 and the adsorption channel 11 are connected by the first connection channel 12. The adsorption channel 11 and the waste liquid channel 22 are connected by the second connection channel 13. Furthermore, the vent channel 27 is connected to the downstream side of the waste liquid channel 22.

In the first state, a specimen can be supplied to the adsorption channel 11 by introducing the specimen from the specimen introduction channel 21. Then, a waste liquid reaches the waste liquid channel 22 and is discharged. Examples of the specimen include body fluids, viruses, bacteria, cells, and extracts thereof. The adsorption channel 11 has the adsorption unit 9 illustrated in FIG. 2, and the adsorbent 9A for adsorbing, for example, a nucleic acid extracted from the specimen by using an extraction liquid is accommodated in the adsorption unit 9.

Next, the rotary valve 3 is rotated clockwise to enter the third state. FIG. 7 is a schematic plan view for explaining a channel connection state in the third state of the inspection chip according to the first embodiment of the present invention. In this state, the washing liquid introduction channel 23, the adsorption channel 11, and the waste liquid channel 22 are connected in this order. In particular, in the present embodiment, the washing liquid introduction channel 23 and the adsorption channel 11 are connected by the first connection channel 12. The adsorption channel 11 and the waste liquid channel 22 are connected by the second connection channel 14. Furthermore, the vent channel 27 is connected to the downstream side of the waste liquid channel 22.

In the third state, a washing liquid can be supplied to the adsorption channel 11 by introducing the washing liquid from the washing liquid introduction channel 23. Then, a waste liquid reaches the waste liquid channel 22 and is discharged. The nucleic acid adsorbed on the adsorbent 9A can be washed with the washing liquid supplied to the adsorption channel 11.

Next, the rotary valve 3 is rotated clockwise to enter the second state. FIG. 8 is a schematic plan view for explaining a channel connection state in the second state of the inspection chip according to the first embodiment of the present invention. In this state, the recovery liquid introduction channel 24, the adsorption channel 11, and the detection channel 26 are connected in this order. In particular, in the present embodiment, the recovery liquid introduction channel 24 and the adsorption channel 11 are connected by the first connection channel 12. The adsorption channel 11 and the detection channel 26 are connected by the second connection channel 15.

In the second state, a recovery liquid can be supplied to the adsorption channel 11 by introducing the recovery liquid from the recovery liquid introduction channel 24. With the recovery liquid, for example, the nucleic acid adsorbed on the adsorbent 9A can be recovered, and the recovered nucleic acid can be supplied to the detection channel 26. Then, a waste liquid reaches the waste liquid channel 22 and is discharged. The detection channel 26 has a detection unit, and can perform a reaction such as PCR by using the supplied nucleic acid or the like. As the recovery liquid, for example, water can be used.

In the present embodiment, in the second state, the mixing channel 25 is provided between the second connection channel 15 and the detection channel 26. In the mixing channel 25, for example, a recovery liquid containing the nucleic acid and a reaction reagent to be fed later can be merged and mixed. Thereafter, the mixed liquid is supplied to the detection channel 26, and thereby a test can be performed. As the reaction reagent, for example, a PCR reaction reagent can be used.

Furthermore, in the present embodiment, the waste liquid channel 22 is connected to the downstream side of the detection channel 26. Furthermore, the vent channel 27 is connected to the downstream side of the waste liquid channel 22.

In the inspection chip 1, as described above, by rotating the rotary valve 3 about the rotation axis B, the channel in the inspection chip 1 can be switched so that the first state and the second state can be taken. Therefore, introduction, washing, recovery, reaction, and the like of a specimen can be performed with a relatively simple structure.

In addition, a recovery rate of the nucleic acid can be further increased by switching the channel in the inspection chip 1 so that the third state can be taken between the first state and the second state and performing cleaning.

Note that the rotary valve 3 may be rotated clockwise to enter the fourth state. FIG. 9 is a schematic plan view for explaining a channel connection state in the fourth state of the inspection chip according to the first embodiment of the present invention. In the fourth state, the upstream end and the downstream end of the detection channel 26, the upstream end and the downstream end of the mixing channel 25, and the upstream end and the downstream end of the waste liquid channel 22 are sealed.

When the waste liquid channel 22 is provided as in the present embodiment, the upstream end and the downstream end of the detection channel 26 can be sealed. In this case, outflow of a reaction product to an outside can be further suppressed. Furthermore, by sealing the upstream end and the downstream end of the mixing channel 25, contamination can be further suppressed. Furthermore, when the vent channel 27 is provided as in the present embodiment, the upstream end and the downstream end of the waste liquid channel 22 can be sealed. In this case, outflow of the waste liquid to the outside can be suppressed with more certainty.

(Other Details)

Channel;

In the present invention, dimensions of the channels are not particularly limited, but are preferably micro channels.

The micro channels as used herein refer to fine channels in which a micro effect is generated when a fluid is conveyed. In such a micro channel, the fluid is strongly affected by surface tension, and exhibits behavior different from that of a fluid flowing through a channel having a typical large size.

Cross-sectional shape and size of the micro channel are not particularly limited as long as the micro channel is a channel in which the micro effect is generated. For example, when a pump or gravity is used when a fluid is caused to flow in the micro channel, a dimension of a shorter side of the micro channel is preferably 20 µm or more, more preferably 50 µm or more, still more preferably 100 µm or more from the viewpoint of further reducing channel resistance when the cross-sectional shape of the micro channel is substantially rectangular (including square). From the viewpoint of further reducing a size of the microfluidic device, the dimension is preferably 5 mm or less, more preferably 1 mm or less, still more preferably 500 µm or less.

When the cross-sectional shape of the micro channel is substantially circular, a diameter (a minor axis in a case of an ellipse) is preferably 20 µm or more, more preferably 50 µm or more, still more preferably 100 µm or more. From the viewpoint of further reducing the size of the microfluidic device, the diameter (a minor axis in a case of an ellipse) is preferably 5 mm or less, more preferably 1 mm or less, still more preferably 500 µm or less.

On the other hand, for example, when a capillary action is more effectively utilized when a fluid is caused to flow in the micro channel, the dimension of the shorter side of the micro channel is preferably 5 µm or more, more preferably 10 µm or more, still more preferably 20 µm or more when the cross-sectional shape of the micro channel is substantially rectangular (including square). Furthermore, the dimension of the shorter side is preferably 200 µm or less, and more preferably 100 µm or less.

Liquid Feeding;

An appropriate liquid feeder can be used to feed the specimen, the washing liquid, or the recovery liquid. In particular, it is preferable to use an optical gas generation tape that generates gas upon irradiation of light.

FIG. 10 is a schematic cross-sectional view for explaining a liquid feeding method using the optical gas generation tape. As illustrated in FIG. 10, in the present embodiment, the fourth channel 10 constituting the specimen introduction channel 21, the washing liquid introduction channel 23, and the recovery liquid introduction channel 24 is opened in the first surface 2a. An optical gas generation tape 31 is attached to the first surface 2a so as to seal this opened portion. Accordingly, the optical gas generation tape 31 is disposed on an upstream side relative to the fourth channel 10 constituting the specimen introduction channel 21, the washing liquid introduction channel 23, and the recovery liquid introduction channel 24. The optical gas generation tape 31 generates gas upon irradiation of light. The specimen, the washing liquid, or the recovery liquid can be fed by the gas thus generated. By feeding a liquid by using the optical gas generation tape 31 provided in the inspection chip 1, contamination from the outside can be further suppressed.

Adsorbent;

The adsorbent 9A is accommodated in the adsorption unit 9 in the adsorption channel 11 illustrated in FIG. 2. The adsorbent 9A can be, for example, used in a form such as a membrane form, a filter form, a plate form, a fibrous form, a tube form, a particle form, or a porous form. Furthermore, the adsorbent 9A can be, for example, made of a silicon compound, a phosphate mineral, a silicate mineral, an aluminosilicate mineral, or the like. In particular, the adsorbent 9A is preferably silica fiber or glass fiber.

Mixing Channel;

The mixing channel 25 is not particularly limited, but for example, a first mixing channel illustrated in FIG. 11 can be used. The first mixing channel 32 is, for example, a channel for merging and mixing a recovery liquid containing nucleic acid and a reaction reagent to be fed later. The first mixing channel 32 has a zigzag structure in plan view. Furthermore, in the first mixing channel 32, a depth of the channel is increased in the hatched portions. Specifically, in the first mixing channel 32, a first channel portion 32a having a relatively deep channel and a second channel portion 32b having a relatively shallow channel are repeatedly and alternately provided. The first channel portion 32a extends in a first direction X1, is bent at a first bent portion 32c, and is continuous with the second channel portion 32b. The second channel portion 32b extends in a second direction X2, is bent at a second bent portion 32d, and is continuous with the first channel portion 32a. The first bent portion 32c and the second bent portion 32d are bent portions that not only bend the channel but also change the depth of the channel. In this manner, the first mixing channel 32 having a zigzag structure in plan view and having a repeated height difference is configured. By providing the first mixing channel 32 having a repeated height difference and having a zigzag structure in plan view, a plurality of liquids can be mixed more accurately.

Alternatively, a second mixing channel illustrated in FIG. 12 may be used.

In the present embodiment, a second mixing channel 33 has a first channel portion 33a and a second channel portion 33b. The first channel portion 33a is a recessed portion in which the channel is enlarged toward one side surface of the inspection chip 1. The second channel portion 33b is a recessed portion in which the channel is enlarged toward the other side surface of the inspection chip 1. The first channel portion 33a and the second channel portion 33b are alternately provided in order, starting with the first channel portion 33a. By thus alternately providing the first channel portion 33a and the second channel portion 33b, a plurality of liquids can be mixed more accurately.

Note that either the first mixing channel 32 or the second mixing channel 33 may be used alone or the first mixing channel 32 and the second mixing channel 33 may be used in combination.

Detection Channel;

The detection channel 26 is a channel having a detection unit that performs PCR or the like. FIG. 13 is a schematic plan view illustrating a channel structure as an example of a detection channel.

As illustrated in FIG. 13, the detection channel 41 has a main channel 42. One end of each of a plurality of branch channels 43 to 45 is connected to the main channel 42. The branch channels 43 to 45 are provided as, for example, reaction tanks for performing a reaction such as PCR. Channel resistance portions 46 to 48 having cross-sectional areas smaller than those of the branch channels 43 to 45 are provided at end portions of the branch channels 43 to 45 on a side opposite to the side connected to the main channel 42. The one end of each of the branch channels 43 to 45 is an inflow end and is open to the main channel 42. The other end of each of the branch channels 43 to 45 is an outflow end and is connected to corresponding one of the channel resistance portions 46 to 48.

Downstream ends of the channel resistance portions 46 to 48 are connected to a connection channel 49. The connection channel 49 is connected to the main channel 42.

Between the adjacent branch channels 43 and 44, a sub branch channel 50 is connected to the main channel 42. Also between the adjacent branch channels 44 and 45, a sub branch channel 51 is connected to the main channel 42. The sub branch channels 50 and 51 have inflow ends connected to the main channel 42, but the sub branch channels 50 and 51 do not have an outlet for gas. The inflow ends of the sub branch channels 50 and 51 are open to the main channel 42.

By providing the sub branch channel 50, contamination of a specimen and a reagent between the branch channels 43 and 44 can be suppressed. The sub branch channel 51 can also suppress contamination between the adjacent branch channels 44 and 45.

Therefore, by providing the detection channel 41 illustrated in FIG. 13, contamination can be further suppressed.
Hydrophobic Filter;

A hydrophobic filter may be provided at the downstream end of the waste liquid channel. As the hydrophobic filter, for example, a polytetrafluoroethylene (PTFE) filter or the like can be used. By providing the hydrophobic filter, it is possible to prevent outflow of the waste liquid to the outside with more certainty Examples of a commercially available hydrophobic filter include PF-020, PF-040, PF-050, and PF-060 (all manufactured by ADVANTEC CO., LTD.).

Second Embodiment (Configuration of Inspection Chip)

FIG. 14 is a schematic plan view for explaining channels in a rotary valve in an inspection chip according to a second embodiment of the present invention. FIG. 15 is a schematic plan view for explaining channels in a chip main body in the inspection chip according to the second embodiment of the present invention.

As illustrated in FIG. 14, on a lower surface 63*a* of a rotary valve 63, a first connection channel 72 and a plurality of second connection channels 73 to 75 are provided. The first connection channel 72 and the second connection channels 73 to 75 are configured in a similar manner to the first embodiment on the lower surface 63*a* of the rotary valve 63.

As illustrated in FIG. 15, a specimen introduction channel 81, a first waste liquid channel 82*a*, a washing liquid introduction channel 83, a recovery liquid introduction channel 84, a detection channel 86, and a second waste liquid channel 82*b* are provided in a chip main body 62.

As in the first embodiment, by rotating the rotary valve 63 about a rotation axis, the first connection channel 72 can be connected to the specimen introduction channel 81, the washing liquid introduction channel 83, and the recovery liquid introduction channel 84. Furthermore, the second connection channels 73 to 75 can be connected to the first waste liquid channel 82*a* and the second waste liquid channel 82*b* and the detection channel 86.

Also in the inspection chip according to the second embodiment, the plurality of connection channels is arranged so that at least a first state and a second state described below can be taken when the rotary valve 63 is rotated about the rotation axis.

The first state is a state in which the specimen introduction channel 81, an adsorption channel 71, and the first waste liquid channel 82*a* are connected in this order from an upstream side. In the present embodiment, the specimen introduction channel 81 and the adsorption channel 71 are connected by the first connection channel 72. Furthermore, the adsorption channel 71 and the first waste liquid channel 82*a* are connected by the second connection channel 73.

The second state is a state in which the recovery liquid introduction channel 84, the adsorption channel 71, and the detection channel 86 are connected in this order from the upstream side. In the present embodiment, the recovery liquid introduction channel 84 and the adsorption channel 71 are connected by the first connection channel 72. The adsorption channel 71 and the detection channel 86 are connected by the second connection channel 75. In the present embodiment, no mixing channel is provided between the second connection channel 75 and the detection channel 86. The second waste liquid channel 82*b* is connected to a downstream side of the detection channel 86. However, a vent channel is not connected to a downstream side of the second waste liquid channel 82*b*.

By rotating the rotary valve 63 and performing the first state and the second state in this order, for example, a nucleic acid extracted from a specimen by using an extraction liquid can be adsorbed to an adsorbent, recovered, and subjected to a test such as PCR in the inspection chip according to the second embodiment.

In the present embodiment, the rotary valve 63 is configured to be rotated about the rotation axis so as to be able to take at least the first state and the second state. In this case, the rotary valve 63 may be configured to take a third state, a fourth state, and the like in addition to the first state and the second state. For example, the rotary valve 63 may be configured to perform a third state of flowing a washing liquid between the first state of flowing a specimen and the second state of flowing a recovery liquid. Furthermore, the rotary valve may be configured to perform a fourth state in which at least an upstream end and a downstream end of the detection channel 86 are sealed.

(Method of Using Inspection Chip)

An example of a method of using the inspection chip according to the second embodiment is described with reference to FIGS. 16 to 19.

FIG. 16 is a schematic plan view for explaining a channel connection state in the first state of the inspection chip according to the second embodiment of the present invention. The rotary valve 63 is rotated to connect the specimen introduction channel 81, the adsorption channel 71, and the first waste liquid channel 82*a* in this order as illustrated in FIG. 16. In the present embodiment, the specimen introduction channel 81 and the adsorption channel 71 are connected by the first connection channel 72. The adsorption channel 71 and the first waste liquid channel 82*a* are connected by the second connection channel 73.

In the first state, a specimen can be supplied to the adsorption channel 71 by introducing the specimen from the specimen introduction channel 81. Then, the waste liquid reaches the first waste liquid channel 82*a* and is discharged. The adsorption channel 71 has an adsorption unit, and an adsorbent for adsorbing, for example, a nucleic acid extracted from the specimen by using an extraction liquid is accommodated in the adsorption unit.

Next, the rotary valve 63 is rotated counterclockwise to enter the third state. FIG. 17 is a schematic plan view for explaining a channel connection state in the third state of the inspection chip according to the second embodiment of the present invention. In this state, the washing liquid introduction channel 83, the adsorption channel 71, and the first waste liquid channel 82*a* are connected in this order. In particular, in the present embodiment, the washing liquid introduction channel 83 and the adsorption channel 71 are connected by the first connection channel 72. The adsorption channel 71 and the first waste liquid channel 82a are connected by the second connection channel 74.

In the third state, a washing liquid can be supplied to the adsorption channel 71 by introducing the washing liquid from the washing liquid introduction channel 83. Then, the waste liquid reaches the first waste liquid channel 82a and is discharged. The nucleic acid adsorbed on the adsorbent can be washed with the washing liquid supplied to the adsorption channel 71.

Next, the rotary valve 3 is rotated counterclockwise to enter the second state. FIG. 18 is a schematic plan view for explaining a channel connection state in the second state of the inspection chip according to the second embodiment of the present invention. In this state, the recovery liquid introduction channel 84, the adsorption channel 71, and the detection channel 86 is connected in this order. In particular, in the present embodiment, the recovery liquid introduction channel 84 and the adsorption channel 71 are connected by the first connection channel 72. The adsorption channel 71 and the detection channel 86 are connected by the second connection channel 75. Furthermore, the second waste liquid channel 82b is connected to a downstream side of the detection channel 86.

In the second state, a recovery liquid can be supplied to the adsorption channel 71 by introducing the recovery liquid from the recovery liquid introduction channel 84. With the recovery liquid, the nucleic acid adsorbed on the adsorbent can be recovered, and the recovered nucleic acid can be supplied to the detection channel 86. Then, the waste liquid reaches the second waste liquid channel 82b and is discharged. The detection channel 86 has a detection unit, and can perform a reaction such as PCR by using the supplied nucleic acid or the like.

In the inspection chip according to the second embodiment, as described above, by rotating the rotary valve 63 about the rotation axis, the channel in the inspection chip can be switched so that the first state and the second state can be taken. Therefore, introduction, washing, recovery, inspection, and the like of a specimen can be performed with a relatively simple structure.

In addition, a recovery rate of the nucleic acid can be further increased by switching the channel in the inspection chip so that the third state can be taken between the first state and the second state and performing cleaning.

Note that the rotary valve 63 may be further rotated counterclockwise to enter the fourth state. FIG. 19 is a schematic plan view for explaining a channel connection state in the fourth state of the inspection chip according to the second embodiment of the present invention. In the fourth state, the upstream end and the downstream end of the detection channel 86 are sealed. By providing the first waste liquid channel 82a and the second waste liquid channel 82b as in the present embodiment, the upstream end and the downstream end of the detection channel 86 can be sealed. In this case, outflow of a reaction product to an outside can be further suppressed.

In the second embodiment, the matters described in the first embodiment can be similarly applied. For example, other configurations described in detail in the first embodiment can be applied.

In the second embodiment, the first waste liquid channel 82a used after feeding the specimen and the washing liquid and the second waste liquid channel 82b used after feeding the recovery liquid are separately provided. In this case, it is possible to suppress air entrainment between the waste liquid used after feeding the specimen and the washing liquid and the waste liquid used after feeding the recovery liquid, and it is possible to reduce a size of the inspection chip. Note, however, that the first waste liquid channel 82a and the second waste liquid channel 82b may be the same waste liquid channel, as in the first embodiment.

EXPLANATION OF SYMBOLS

1: Inspection chip
2, 62: Chip main body
2a, 2b: First, second surface
3, 63: Rotary valve
3a, 63a: Lower surface
4: Substrate
5: Sealing sheet
6, 7, 8: First, second, third channel
9: Adsorption unit
9A: Adsorbent
10: Fourth channel
11, 71: Adsorption channel
12, 72: First connection channel
13 to 15, 73 to 75: Second connection channel
21, 81: Specimen introduction channel
22: Waste liquid channel
23, 83: Washing liquid introduction channel
24, 84: Recovery liquid introduction channel
25: Mixing channel
26, 41, 86: Detection channel
27: Vent channel
31: Optical gas generation tape
32, 33: First, second mixing channel
32a, 33a: First channel portion
32b, 33b: Second channel portion
32c, 32d: First, second bent portion
41: Detection channel
42: Main channel
43, 44, 45: Branch channel
46, 47, 48: Channel resistance portion
49: Connection channel
50, 51: Sub branch channel
82a, 82b: First, second waste liquid channel

The invention claimed is:
1. An inspection chip comprising:
a chip main body having a specimen introduction channel, an adsorption channel including an adsorption unit, a first waste liquid channel, a recovery liquid introduction channel, and a detection channel including a detection unit; and
a rotary valve attached to the chip main body so as to be rotatable about a rotation axis,
the rotary valve having a plurality of connection channels,
the plurality of connection channels being arranged so that the rotary valve is capable of taking at least a first state and a second state when the rotary valve rotates about the rotation axis,
the first state being a state in which the specimen introduction channel, the adsorption channel, and the first waste liquid channel are connected such that the specimen introduction channel is upstream of the adsorption channel and the adsorption channel is upstream of the first waste liquid channel, and
the second state being a state in which the recovery liquid introduction channel, the adsorption channel, and the detection channel are connected such that the recovery liquid introduction channel is upstream of the adsorp- tion channel and the adsorption channel is upstream of the detection channel, wherein
the plurality of connection channels is arranged so that the rotary valve is capable of further taking a fourth state after the second state when the rotary valve rotates about the rotation axis, the fourth state being a state in which an upstream end and a downstream end of the detection channel are sealed by the rotary valve.

2. The inspection chip according to claim 1, wherein, in the second state, one of the plurality of connection channels connects a downstream end of the adsorption channel and an upstream end of the detection channel.

3. The inspection chip according to claim 1, wherein
the chip main body further has a mixing channel; and
in the second state, the recovery liquid introduction channel, the adsorption channel, the mixing channel, and the detection channel are connected so as to be provided in this order from the upstream side.

4. The inspection chip according to claim 1, wherein
the chip main body further has a second waste liquid channel; and
in the second state, the recovery liquid introduction channel, the adsorption channel, the detection channel, and the second waste liquid channel are connected so as to be provided in this order from the upstream side.

5. The inspection chip according to claim 4, wherein
the chip main body further has a vent channel; and
in the second state, the recovery liquid introduction channel, the adsorption channel, the detection channel, the second waste liquid channel, and the vent channel are connected so as to be provided in this order from the upstream side.

6. The inspection chip according to claim 1, wherein
the chip main body further has a washing liquid introduction channel; and
the plurality of connection channels is arranged so that the rotary valve is capable of taking at least the first state, the second state, and a third state when the rotary valve rotates about the rotation axis, the third state being a state in which the washing liquid introduction channel, the adsorption channel, and the first waste liquid channel are connected so as to be provided in this order from the upstream side.

7. The inspection chip according to claim 6, wherein
the plurality of connection channels is arranged so that the rotary valve is capable of taking the first state, the third state, and the second state in this order when the rotary valve rotates about the rotation axis.

8. The inspection chip according to claim 4, wherein
the plurality of connection channels is arranged so that the rotary valve is capable of further taking a fifth state after the second state when the rotary valve rotates about the rotation axis, the fifth state being a state in which an upstream end and a downstream end of the detection channel are sealed and an upstream end and a downstream end of the second waste liquid channel are sealed.

9. The inspection chip according to claim 1, wherein the adsorption channel is provided at a position where the adsorption channel overlaps the rotary valve in plan view.

10. The inspection chip according to claim 4, wherein a hydrophobic filter is connected to a downstream end of at least one of the first waste liquid channel and the second waste liquid channel.

11. The inspection chip according to claim 1, further comprising an optical gas generation tape disposed upstream of the specimen introduction channel,
wherein the optical gas generation tape generates a gas upon irradiation of light such that the gas causes flow of liquid in the inspection chip.

* * * * *